UNITED STATES PATENT OFFICE.

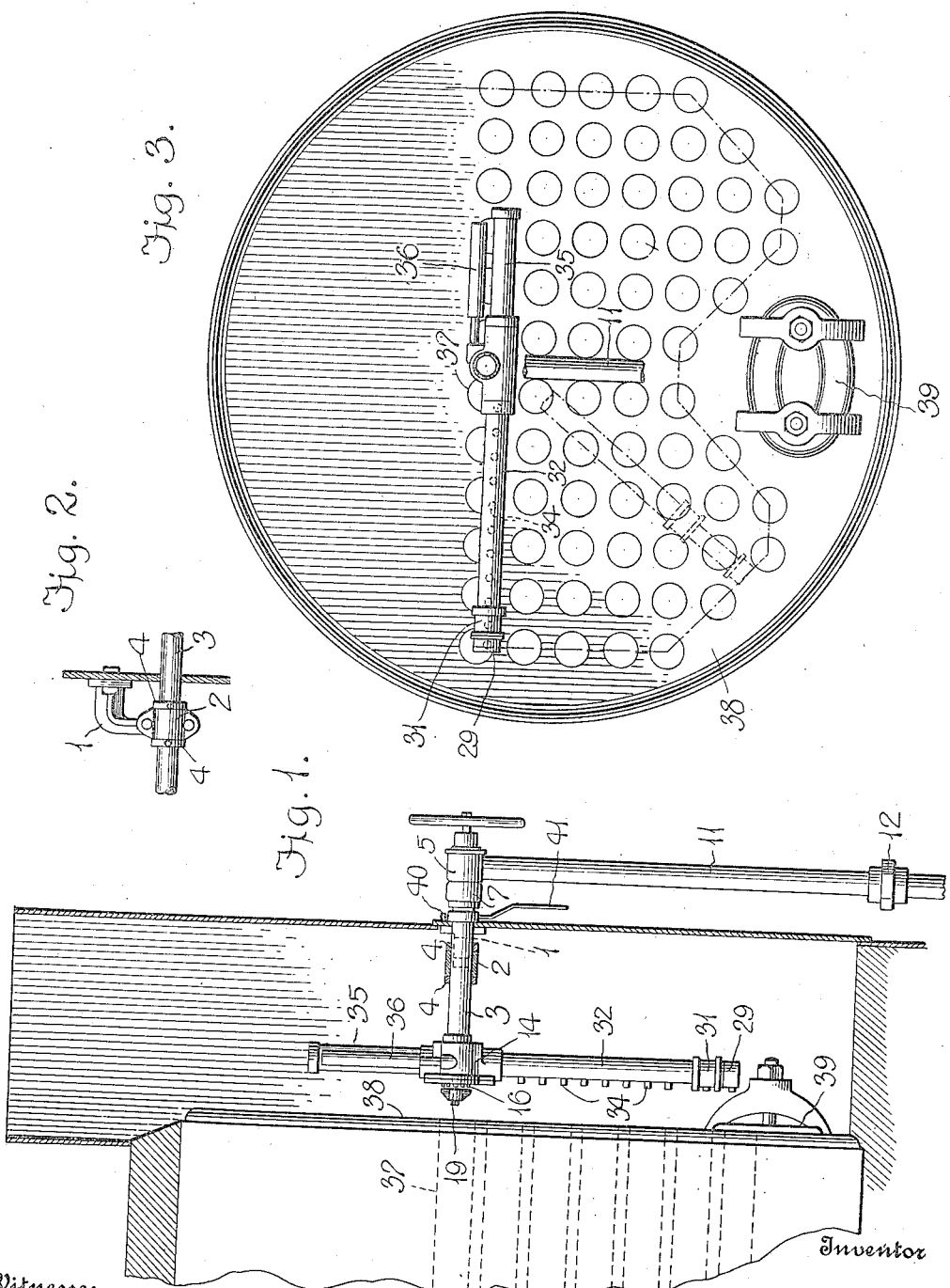

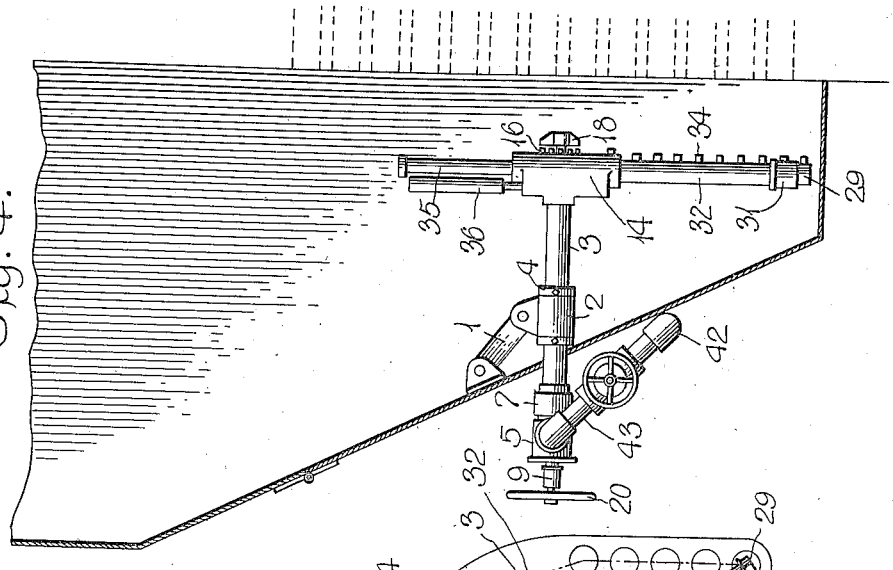
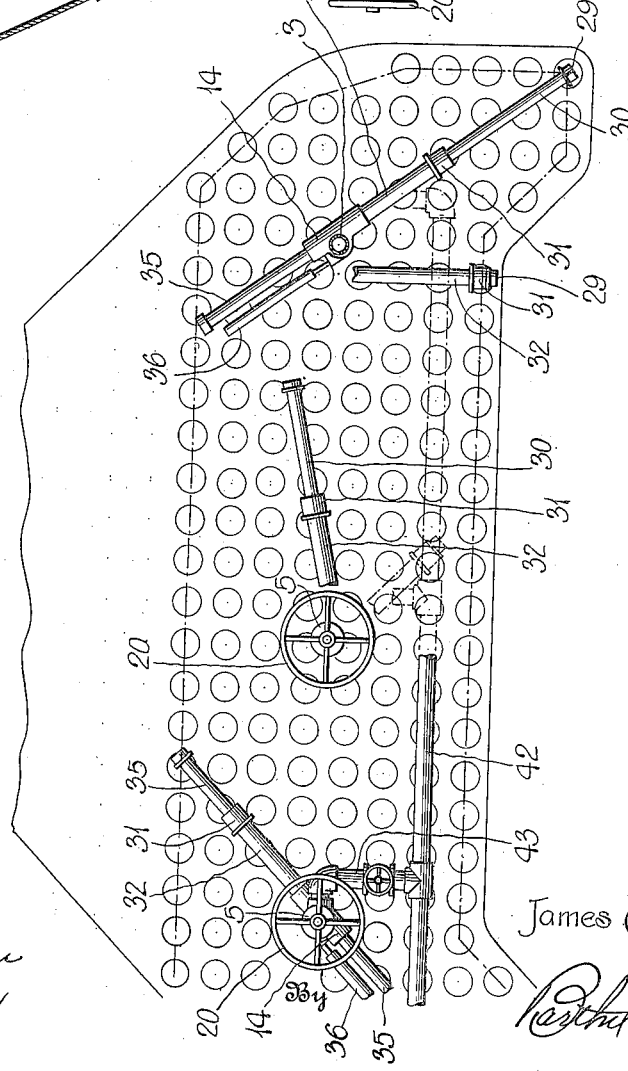

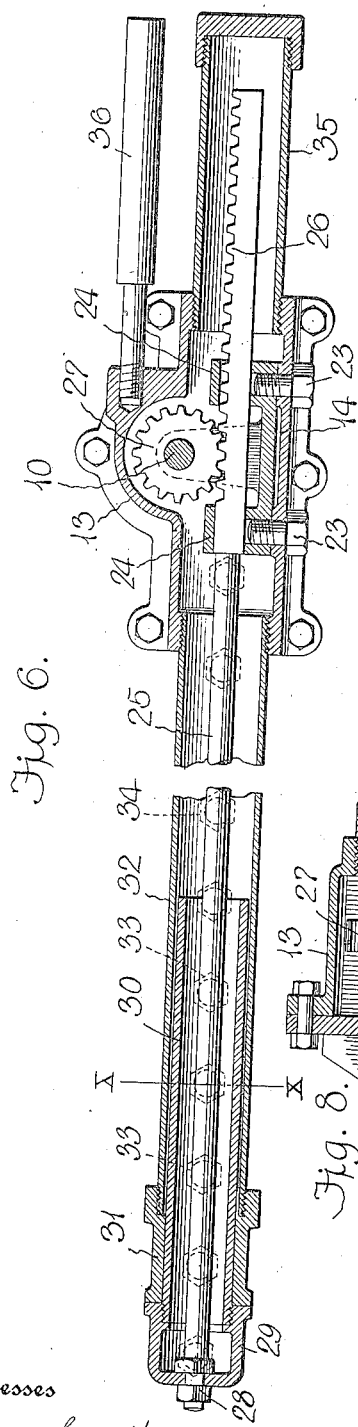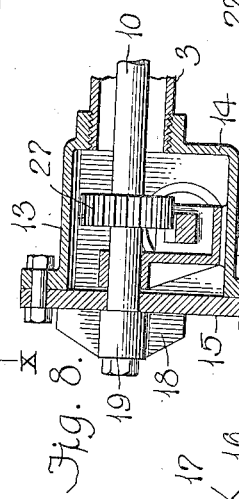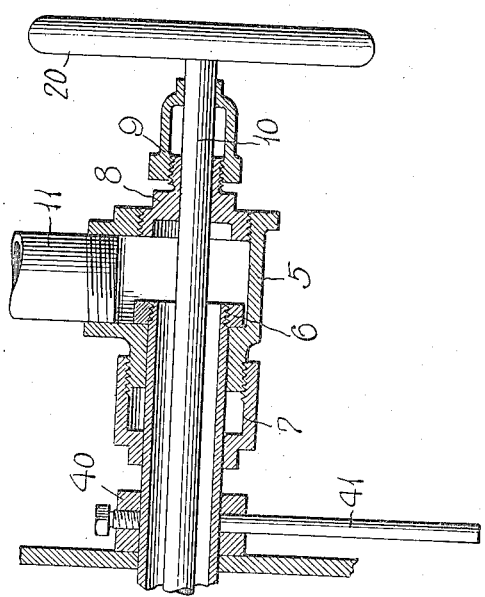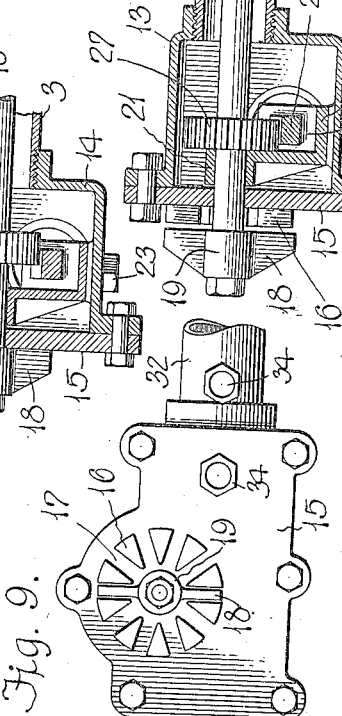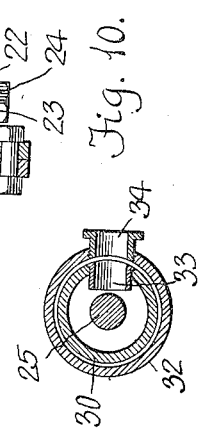

JAMES C. BENNETT, OF DETROIT, MICHIGAN.

BLOWER FOR BOILERS.

1,141,304.  Specification of Letters Patent.  Patented June 1, 1915.

Application filed February 1, 1915. Serial No. 5,397.

*To all whom it may concern:*

Be it known that I, JAMES C. BENNETT, a citizen of the United States of America, residing at Detroit, in the county of Wayne and State of Michigan, have invented certain new and useful Improvements in Blowers for Boilers, of which the following is a specification, reference being had therein to the accompanying drawings.

This is an improvement in connection with the blower disclosed by my Patent No. 1,095,931 granted May 5, 1914, and the object of the present invention is to utilize the oscillatory blower and the reciprocable element thereof, as shown in my prior patent, and provide simple and more durable operating mechanism for the same, that obviates the necessity of using the guide frame, sprocket wheel, chain and other devices employed in connection with the blower above referred to.

A further object of my invention is to provide a blower for a horizontal and marine boiler that can be easily and quickly manipulated at the flue sheet of a boiler for injecting steam or a suitable soot removing agent, into each and every flue of the boiler irrespective of its location. The blower by which I accomplish this and other results will be hereinafter specifically described and then claimed, and reference will now be had to the drawings, wherein—

Figure 1 is a side elevation of the blower in connection with a horizontal boiler; Fig. 2 is a plan of a blower bracket; Fig. 3 is a front elevation of the blower partly broken away and illustrating its relation to a flue sheet; Fig. 4 is a side elevation of the blower in connection with a marine boiler; Fig. 5 is a diagrammatic view illustrating the path of travel of blowers of a marine boiler; Fig. 6 is a longitudinal sectional view of the blower head, partly broken away; Fig. 7 is a longitudinal sectional view of the blower partly broken away, showing the blower head in cross section and the mechanism in position for reciprocating the steam ejecting element of the blower; Fig. 8 is a cross sectional view of the blower head showing the mechanism in position for oscillating the head; Fig. 9 is an elevation of a portion of the blower head, illustrating the locking device, and Fig. 10 is an enlarged cross sectional view taken on the line X—X of Fig. 6.

Referring first to Figs. 1, 2, 3 and 6 to 10 inclusive, the reference numeral 1 denotes a bracket secured to a boiler door, setting, or other suitable support and said bracket is provided with a two-part bearing 2 in which there is journaled a main blower pipe 3. To prevent longitudinal movement of the main blower pipe 3 relative to the bearing 2 of the bracket 1, said pipe, at each end of the bearing 2, is provided with collars 4. The outer end of the pipe 3 is rotatable in an angle connection 5 and has a detachable collar 6 within the connection. One end of the angle connection 5 has a conventional form of stuffing box 7 and the opposite end thereof a bearing 8 and stuffing box 9 for a reciprocatory and rotary shaft 10 disposed longitudinally of the main blower pipe 3. The angle connection 5 is in communication with a steam supply pipe 11 provided with a union 12 whereby the pipe 11 can be disconnected to permit of the blower being moved relative to a boiler setting or a permanent steam supply pipe.

Mounted on the inner end of the main blower pipe 3 is the offset portion 13 of a hollow blower head 14. A side of the hollow blower head 14 is closed by a detachable plate 15 and through this plate extends the inner ends of the shaft 10. The outer side of the plate 15 has sector shaped lugs 16 disposed circumferentially of the shaft 10, said lugs providing grooves 17 adapted to receive the tongues 18 of a locking member 19 mounted upon the shaft 10. The outer end of the shaft 10 has a hand wheel 20 and by reciprocating the shaft 10 the tongues 18 of the locking member can be moved in and out of the groove 17 of the blower head.

In the hollow blower head 14 the shaft 10 is journaled in a bearing 21 carried by a plate 22 secured in the head by screws 23 or other fastening means. The plate 22 has the ends thereof provided with guides 24 for a rack bar 25, which has the inner end thereof provided with a rack 26 engaged by a pinion 27 mounted upon the shaft 10 within the head 14. The outer end of the rack bar 25 is detachably connected, as at 28 to a cap 29 mounted upon the outer end of the telescopic member 30, slidable in a bearing 31, carried by a member 32 connected to the hollow head 14. The members 30 and 32 constitute a steam ejecting arm that can be elongated by the telescopic member 30 and this member is provided with a plurality of spaced nipples 33 adapted to register with nozzles 34 carried by the member 32. The members 30 and 32 are tubular and communicate with the main blower pipe 3 through the medium of the hollow head 14, consequently the members 30 and 32 can receive a supply of steam from the pipe 11 to discharge the same through the nipples 33 and the nozzles 34.

Alining with the tubular member 32 is a rack bar casing or cage 35, carried by the hollow head 14 closing the end of said head, besides providing clearance for the rack bar when shifted longitudinally of the head 14. Parallel with the casing or cage 35 is a counterbalance arm 36 carried by the offset portion 13 of the head 14, said counterbalance coöperating with the casing or cage 35 in providing substantially an equi-balanced blower. An installation of the blower in connection with a horizontal boiler is shown in Figs. 1 and 6, where it will be observed that the blower head 14 and its telescopic steam ejecting arm are located in a plane with the top row of flues 37 and in parallelism with the flue sheet 38. The main blower pipe 3 is approximately axially of the flue sheet 38 and this arrangement of the blower permits of the blower head being operated throughout the area presented by the open ends of the flues. To oscillate the blower head 14 the hand wheel 20 is manipulated to place the locking device 19 in engagement with the blower head 14 and then by rotating the wheel first counterclockwise and then clockwise or vice versa, the blower head is swung in front of the open ends of the flue. With the telescopic member 30 in a retracted position, the outer end of the member 32 can clearly pass the crab 39 of the flue sheet 38 and when swung in such an arc the outermost flues 37 are missed by the steam ejecting arms but to reach these outermost flues, it is only necessary to extend the member 30 relative to the member 32. This is accomplished by pushing inwardly upon the shaft 10 to unlock the device 19 and then by rotating the shaft 10 the pinion 27 imparts movement to the rack bar 25, which extends the member 30, thereby allowing the outer end of the member to be swung in an irregular course, as indicated by the dot and dash lines of Fig. 3.

To steady the blower while the member 30 is being reciprocated, the main blower pipe 3 is provided at the outer side of the boiler 30 with a collar 40 and a handle 41, said handle being held in one hand while the wheel 20 is revolved with the opposite hand to shift the member 30 longitudinally of the member 32. In some instances it may not be necessary to use the collar 40 and the handle 41, as the blower head may remain stationary while the telescopic arm is actuated.

I attach considerable importance to the fact that the outer end of the steam ejecting arm can be swung in an irregular path or course and first made to clear the crab of a flue sheet and reach all flues in proximity thereto, consequently the blower can be oscillated and reciprocated in synchronism.

Figs. 4 and 5 show the blowers in connection with a marine boiler and when a battery of blowers are used, it is preferable to place a permanent steam supply pipe 42 transversely of a boiler and provide branches 43 from said pipe to the main blower pipes 3. By reference to Fig. 5 it will be observed that the blowers can be operated to discharge steam into all of the flues of the flue sheet and that it is only necessary to extend the steam ejecting arm to reach such flues that could not be served by an ordinary swinging arm.

In my former patent it will be observed that the reciprocal element is actuated exteriorly of the blower head and that the mechanism is subjected to the accumulation of soot and other matter. In the present instance, the ejector head is adjustable in its longitudinal dimension with means in the head for elongating the same, and means on the head for locking the head against accidental adjustment. The actuating mechanism is fully protected from the accumulation of soot and from a practical standpoint the present blower is more useful and cheaper to manufacture than that disclosed by my prior patent.

I attach considerable importance to the bracket 1 having two pivotal connections, as said bracket permits of the blower adjusting itself to a boiler setting or outer wall, irrespective of the inclination of the same. This and other details of construction possess many advantages, and while in the drawings there are illustrated the preferred embodiments of my invention, it is to be understood that the structural elements are susceptible to such variations and modifications as fall within the scope of the appended claims.

What I claim is:—

1. In a steam blower for boilers having a flue sheet, an ejector head adjustable in its longitudinal dimension and in a plane parallel with the flue sheet of the boiler, and manually operated means in said head for adjusting said head during the injection of steam.

2. In a steam blower, an ejector head adjustable in its longitudinal dimension and adapted to eject steam, means in said head for increasing or decreasing the length of the same during an injection of steam, and means on said head for locking said head against accidental adjustment.

3. In a blower for boilers having flue sheets, and oscillatory head permanently located in front of a flue sheet, a reciprocal element in said head, and means carried by said head for locking said reciprocal element relative to said head.

4. In a steam ejector for blowing boiler flues, an oscillatory head adapted to have the outer end thereof moved in an irregular course during the ejection of steam, and means in said head for regulating the course traversed by the outer end of said head.

5. In a steam blower for boilers, an oscillatory head adapted for permanent location in a plane parallel with the boiler sheet, a telescopic steam ejecting member carried thereby, and rigid means in said head for shifting said telescopic member.

6. In a steam blower for boilers, as oscillatory head adapted for permanent location in a plane parallel with a boiler flue sheet, a steam ejecting member movable in and out of said head, and rigid means extending longitudinally of said member into said head and adapted to be actuated therein for shifting said member.

7. In a steam blower for boilers, an oscillatory head adapted for permanent location in a plane parallel with a boiler flue sheet, a telescopic steam ejecting member carried thereby, and rigid means extending into said head adapted to shift said member during an oscillatory movement of said head.

8. In a steam blower for boilers having flue sheets, an oscillatory head having a permanent position relative to the flue sheet of a boiler, a steam ejecting member movable radially relative to said head and in a plane parallel with the boiler flue sheet, and a rack and pinion in said head adapted to shift said member.

9. In a steam blower for boilers, a head having a permanent position in a boiler in parallelism with a flue sheet thereof, a reciprocal steam ejecting arm carried thereby, a rigid element throughout the length of said arm and means in said head and movably engaging said element for simultaneously oscillating said head and reciprocating the arm thereof.

10. In a steam blower for boilers having a flue sheet provided with a crab, of a steam ejecting arm, means adapted to move said arm and means operable independent of the first mentioned means adapted to move the end of said arm in an irregular course over the crab of said flue sheet to inject steam into flues in proximity to said crab.

11. In a steam blower for boilers having flue sheets, a rotatable blower pipe extending into a boiler, a hollow blower head on said pipe permanently positioned in a plane parallel with a flue sheet, a member carried by an end of said head, a slidable steam ejecting arm in said member, a rack bar connected to said arm, and a pinion in said head meshing with said rack bar and adapted to be operated from the outer end of said blower pipe.

12. In a steam blower for boilers having flue sheets, a rotatable blower pipe extending into a boiler, means supporting said blower pipe, a hollow blower head on said pipe permanently positioned in a plane parallel with a flue sheet, a member carried by one end of said head, a casing carried by the opposite end of said head, a slidable steam ejecting arm in said member, a rack bar connected to said arm adapted to extend into said casing and a pinion in said head meshing with said rack bar and adapted to be operated from the outer end of said blower pipe.

13. In a steam blower for boilers having flue sheets, a rotatably blower pipe extending into a boiler, a hollow blower head on said pipe permanently positioned in a plane parallel with the flue sheet, a member carried by an end of said head, a slidable ejecting arm in said member, a rack bar connected to said arm, a pinion in said head meshing with said rack bar and operable from the outer end of said blower pipe, and means adapted to lock said pinion relative to said blower pipe.

14. In a steam blower for boilers having flue sheets, a rotatable blower pipe extending into a boiler, a hollow blower head on said pipe permanently positioned in a plane parallel with the flue sheets, a slidable steam ejecting arm carried by said head, a rotatable and reciprocable shaft in said blower pipe, means in said head actuated by said shaft to slide said arm, and means shifted by a reciprocatory movement of said shaft adapted to lock said shaft relative to said head whereby said pipe and shaft can be rotated in synchronism.

In testimony whereof I affix my signature in presence of two witnesses.

JAMES C. BENNETT.

Witnesses:
KARL H. BUTLER,
ANNA M. DORR.